United States Patent [19]

Ueda et al.

[11] Patent Number: 4,524,402
[45] Date of Patent: Jun. 18, 1985

[54] ROTARY MAGNETIC HEAD DRUM APPARATUS

[75] Inventors: Sachio Ueda, Sagamihara; Shigehiro Toriyama, Yamato; Yuichi Matsushita, Ebina, all of Japan

[73] Assignee: Sony Corporation, Tokyo, Japan

[21] Appl. No.: 393,295

[22] Filed: Jun. 29, 1982

[30] Foreign Application Priority Data

Jul. 3, 1981 [JP] Japan .................. 56-103202

[51] Int. Cl.$^3$ .................. G11B 5/10; G11B 15/60
[52] U.S. Cl. .................. 360/130.24; 360/84; 360/129
[58] Field of Search .................. 360/84, 129, 130.24

[56] References Cited

U.S. PATENT DOCUMENTS

T941,022 12/1975 Freeman et al. ............... 360/130.24

Primary Examiner—Robert S. Tupper
Attorney, Agent, or Firm—Lewis H. Eslinger; Alvin Sinderbrand

[57] ABSTRACT

A rotary magnetic head drum apparatus for a video tape recorder of a helical scan type having small projecting members provided on a fixed drum of a rotary magnetic head assembly in the vicinity of the switching positions at the entrance and exit sides for a magnetic tape. The projecting members cause the magnetic tape locally to be displaced radially outward from the surface of the fixed drum so as to reduce longitudinal vibration of the magnetic tape and hence reduce impact error in a signal reproduced on the magnetic tape by two rotary magnetic heads.

7 Claims, 13 Drawing Figures

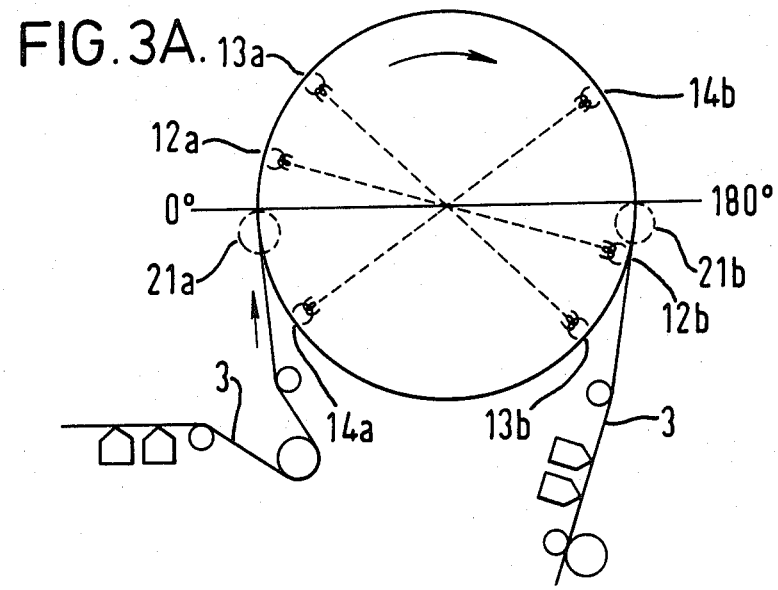
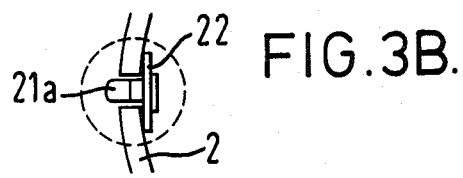
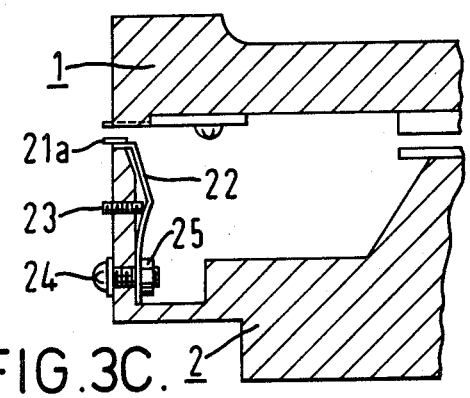

FIG. 6A.
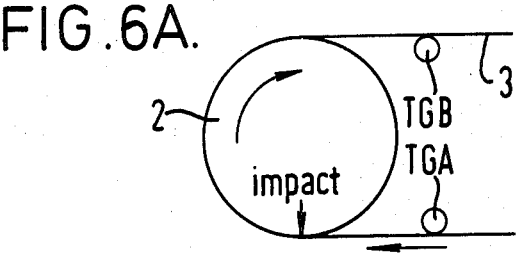
FIG. 6B.
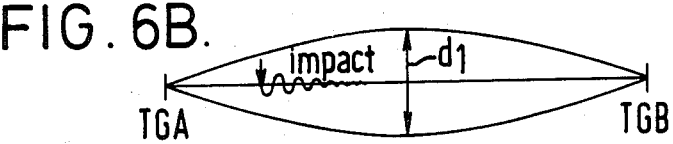
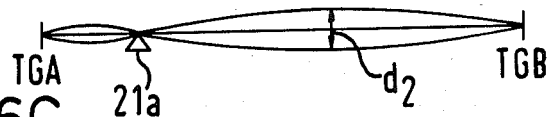
FIG. 6C.
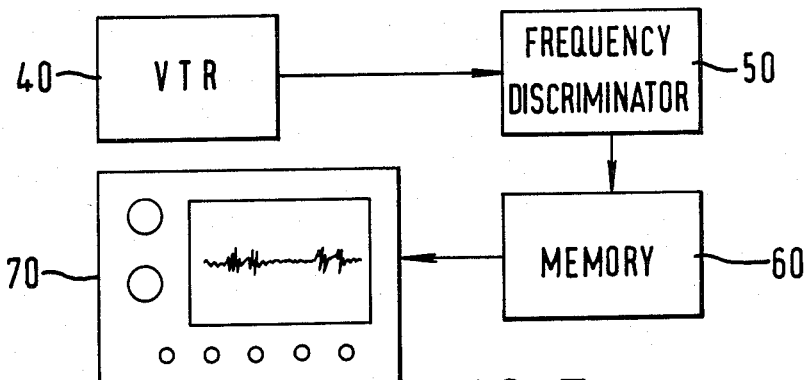
FIG. 7.

ROTARY MAGNETIC HEAD DRUM APPARATUS

BACKGROUND OF THE INVENTION

1. Field of the Invention

This invention relates to a rotary magnetic head drum apparatus for use with a helical scan type video tape recorder.

2. Description of the Prior Art

In a helical scan type video tape recorder (hereinafter, simply referred to as a VTR), a rotary magnetic head is generally rotated on the external periphery of a rotary drum at thirty times per second in the case of a thirty frame per second television signal. If the diameter of the rotary drum is 75 mm, then the relative speed of the magnetic tape and the magnetic head is relatively high, typically, approximately 7 meters per second. For this reason, hitting caused at the instant when the rotary magnetic head first contacts or parts from the magnetic tape, gives rise to the creation of an impulse wave on the magnetic tape. The magnetic tape is influenced by this impulse wave so that a so-called impact error is developed in a reproduced output. This results in degradation of, and colour phase irregularities in, the picture reproduced on a screen by the reproduced output.

FIG. 1 and FIGS. 2A and 2B of the accompanying drawings respectively illustrate examples of previously proposed means for reducing the impact error mentioned above.

In the case of FIG. 1, a slant guide 5 is provided on the exit side of a rotary drum 1 of a typical 1.5 head VTR, around which a magnetic tape 3 is wound in an omega shape over substantially 360°, so that a damping effect of an air layer which is established between the magnetic tape 3 and the slant guide 5 reduces the impact error.

In the case of FIG. 2A, a stepped guide 4 as shown in FIG. 2B is provided on the exit side of a drum of a two-head type VTR comprising a rotary drum 2 around which a magnetic tape 3 is wound over substantially 180°. By the use of the stepped guide 4, tension is locally applied to the tape 3 so as to reduce the impact error.

Due to considerations of convenience of the loading of the magnetic tape onto the rotary drum, both of the examples described above provide known means for avoiding the impact error, however, at a position spaced apart from the position where the rotary magnetic head actually hits the magnetic tape. As a result, the impact error reducing effect achieved is insufficient, particularly in a multi-head type rotary drum used in a high quality VTR.

SUMMARY OF THE INVENTION

Accordingly, it is an object of the present invention to provide a rotary magnetic head drum in which this problem is substantially overcome.

It is another object of the present invention to provide a rotary magnetic head drum having provided therein means for reducing the effects resulting from hitting, this means being positioned near the place on the drum itself where the hitting occurs.

According to the present invention there is provided a rotary magnetic head drum apparatus of a helical scan type video tape recorder comprising a fixed drum, around which a magnetic tape is wound for reproduction, at least one rotary magnetic head for reproducing a signal from said magnetic tape, at least one switching position for said magnetic head positioned relative to said fixed drum and adjacent to a first position where said magnetic tape first contacts said fixed drum on the entrance side and positioned adjacent a second position where said magnetic tape parts from said fixed drum on the exit side, and a further projecting member which radially projects from the outer surface of said fixed drum adjacent to said switching position to contact said magnetic tape and locally displace said magnetic tape radially outward from said outer surface thereby to consequently reduce the impact error in a signal reproduced from said magnetic tape by said magnetic head.

The above, and other objects, features and advantages of this invention will be apparent from the following detailed description of illustrative embodiments which is to be read in connection with the accompanying drawings.

BRIEF DESCRIPTION OF THE DRAWINGS

FIGS. 3A, 3B and 3C are a plan diagram, an enlarged detail and a cross-sectional diagram, respectively, of an embodiment of a rotary magnetic head drum apparatus according to the present invention;

FIGS. 6A, 6B and 6C are diagrams used to explain the function of the I-tip; and

FIG. 7 is a block diagram used to define a method of adjusting the projection distance of an I-tip.

DESCRIPTION OF THE PREFERRED EMBODIMENTS

Figure 1:
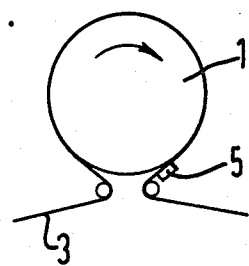
FIG. 1 and FIGS. 2A and 2B are diagrams used above for explaining respective examples of known means for reducing impact error.
Figure 2A:
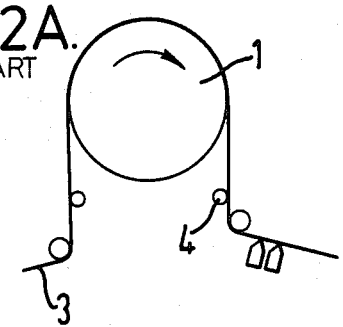
Figure 2B:

An embodiment of a rotary magnetic head drum apparatus according to the present invention will now be described with reference to the drawings.

In FIGS. 3A to 3C is shown, in particular, an impact error preventing tip (hereinafter simply referred to as an I-tip) which is mounted on a rotary magnetic head assembly.

The rotary magnetic head drum apparatus comprises a rotary drum 1, a fixed drum 2 and a magnetic tape 3. The rotary drum 1 has a pair of rotary record/playback heads 12a and 12b, a pair of rotary erase heads 13a and 13b, and a pair of rotary playback heads 14a and 14b mounted thereon at appropriate angular spacings as indicated in FIG. 3A, and which scan recorded tracks on the magnetic tape 3 as it is transported in the direction indicated by an arrow in the figure. Reference numeral 21a denotes one of the I-tips mounted on the fixed drum 2. The I-tip 21a is slightly displaced from the 0° axis, which is the switching position of the rotary drum 1, and the type of switching position, either entrance or exit is dependant upon the direction from which the magnetic tape 3 is being transported around the drum. As shown in FIGS. 3B and 3C in detail, the I-tip 21a is secured by an adhesive agent or the like on the upper end of an I-tip supporting member 22 made of a resilient leaf-like plate and is positioned on the inside of the fixed drum 2. It is preferable that the I-tip 21a is made of sintered ferrite or like material, this being the normal wear resistant material used for rotary magnetic heads. Preferably the I-tip 21a has its end shaped similar to that of a magnetic head.

In FIG. 3C, the I-tip supporting member 22 is shown fixed to the side surface of the fixed drum 2 by a fixing screw 24 and a fixing nut 25. An adjusting screw 23 is screwed through the fixed drum 2 and contacts the I-tip supporting member 22 so that rotation of the adjusting screw 23 permits the projecting distance d of the I-tip 21a to be adjusted. Thus, the projecting distance d of the I-tip 21a can be adjusted so as to minimize the impact error using an adjusting method, which will be described below, while the VTR is being driven in the playback mode.

Figure 4:
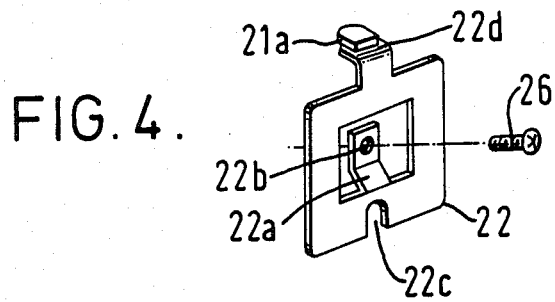
FIG. 4 is a perspective view of a supporting member for an I-tip in the head drum apparatus of FIG. 3.

FIG. 4 shows another form of the I-tip supporting member 22. This I-tip supporting member 22 is punched from resilient metal and has a central aperture in which is formed an attaching member 22a. A fixing screw 26 passes through an aperture 22b in the attaching member 22a to hold the I-tip supporting member 22 to the inside of the fixed drum 2. The projecting distance d of the I-tip 21a which is fixed on the upper end of a bent piece 22d of the I-tip supporting member 22 is adjusted from the outside surface of the fixed drum 2 by rotation of a slotted adjusting screw (not shown) which engages into a notch 22c formed on the lower side of the I-tip supporting member 22.

Turning back to FIG. 3A, a further I-tip 21b is provided at the exit side of the rotary drum 2 where the magnetic tape 3 leaves the rotary drum 2. The I-tip 21b is displaced by several degrees beyond the angle of 180° relative to the entrance side of the drum, and is adjacent the switching position of the rotary drum 1, and is further attached to the fixed drum 2 similarly to the I-tip 21a described above.

The invention is not limited to the multi-head type rotary magnetic head as described above, but can also be applied to a two-head type. It can also be applied to a magnetic head assembly whose upper and lower drums are both fixed and in which only the magnetic head or heads rotate.

Figure 5A:
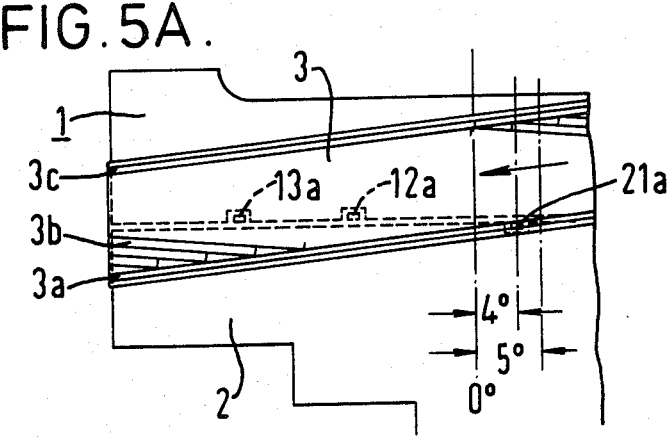
FIGS. 5A and 5B are side views each showing a positional relationship between an I-tip and a magnetic tape.
Figure 5B:
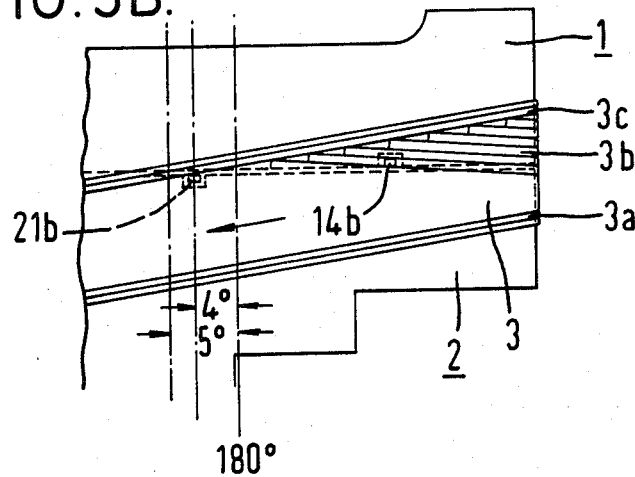

FIGS. 5A and 5B show contact relations of the I-tips 21a and 21b with the magnetic tape 3 at the entrance and exit sides of the magnetic tape 3. In FIG. 5A, the magnetic tape 3 is shown as being transported from the direction shown by an arrow in the figure, contacting with the fixed drum 2 at a position with an angle of about 5° advanced from the angle 0° of the fixed drum 2 and contacting with the I-tip 21a at the position with an angle of about 4° advanced from the angle 0°. With such a positional relationship, the locus 3a where the I-tip 21a contacts the magnetic tape 3 can be selected to be the middle position between the first audio track channel of the magnetic tape 3 and the second audio channel track thereof. In this case, reference character 3b denotes one portion of the video tracks scanned by the rotary head, while 3c denotes a recorded track of a control (CTL) signal. The attachment position of the I-tip 21b at the exit side of the magnetic tape 3 shown in FIG. 5B may be about 4° beyond the angle of 180° of the fixed drum 2 similar in relation to the I-tip 21a at the entrance side of the magnetic tape 3. Since the I-tip 21b contacts video tracks recorded on the magnetic tape 3, the tip of the I-tip 21b must also have an extremely smooth or mirror finish so as not to damage a tape coating.

If the I-tips 21a and 21b are provided in the respective positions mentioned above, it is possible to substantially eliminate the influence of impact error on the video track 3b. But, if the above I-tips 21a and 21b are provided at positions on the fixed drum 2 with angles other than the angle of 4° mentioned previously, some reduction in the impact error can still be achieved. In particular, if an angle of 6° is used at the entrance side, sufficient reduction in the effect of impact error can still be achieved.

Next, the actual mechanism by which the I-tips 21a and 21b prevent the impact error will now be described.

Initially, the actual formation of impact error will be described.

As shown in FIG. 6A, when the magnetic tape 3 is wound around the rotary drum 1 and is being transported, the magnetic tape 3 can be regarded as a vibrating band (see FIG. 6B) the ends of which are fixed at an entrance side guide post TGA and an exit side guide post TGB the tape being under some tension.

Accordingly, if such a vibrating band is hit by a rotary magnetic head at the entrance (or exit) side of the drum, free vibration or oscillation of amplitude $d_1$, will occur and one wave of which extends from the guide post TGA to the guide post TGB. Since longitudinal wave vibration is caused to this free oscillation and is propagated as expansion and contraction of the magnetic tape 3, frequency modulated noise results from the impact error in the output reproduced from the magnetic tape 3 by a magnetic head, thus resulting in picture deformations and colour phase irregularities.

However, in embodiments of the invention, such impact error can be reduced for the following reasons. Since the I-tip 21a (or 21b) is provided near the place where the magnetic tape 3 is hit by the rotary magnetic head, as shown in FIG. 6C, the free vibration or oscillation caused by the hitting of the rotary magnetic head is severely restricted by the I-tip 21a (or 21b) so as to reduce the overall amplitude $d_2$ of the oscillation and hence shortens the length of the wave. The longitudinal wave vibration resulting from this free oscillation is attenuated in a relatively short time period because the tape tension near the position where the magnetic tape 2 is hit by the rotary magnetic head is increased by the projection of the I-tip 21a (or 21b). Moreover, the impulsive force of the rotary magnetic head as it hits the magnetic tape 3 is weakened by a deformation of the magnetic tape 3 corresponding to the projection of the I-tip 21a (or 21b).

The most effective mounting position for the I-tips 21a and 21b and what projection distance will be most effective in practice are somewhat different for different kinds or classes of VTRs, but in all cases a position relatively near the place where the magnetic tape 3 is hit by the rotary magnetic head is effective.

Next, a method of adjusting the projection distance of the I-tips 21a and 21b will be discussed with reference to FIG. 7.

In FIG. 7, reference numeral 40 denotes a VTR provided with the I-tips 21a and 21b to be adjusted, which reproduces a magnetic tape on which a standard signal with a frequency of about 3.5 MHz is recorded. The reproduced output therefrom is supplied to and detected by a frequency discriminator 50 which produces the detected output. The detected output is supplied to a memory 60, where the detected output is stored or accumulated at every one field. The output therefrom is supplied to a synchroscope 70 to permit the output to be observed. In the synchroscope 70, it is observed that at the place where frequency error is consistently caused by the hitting of the rotary magnetic head, the error signal is emphasized while the error signals occuring at random (that is from other components) are cancelled by the accumulation of the detected outputs in the memory 60 and hence made substantially zero.

Therefore, while observing the waveform of the detected output on the synchroscope 70, the projecting amount of the I-tips 21a and 21b provided in the VTR 40 are adjusted so as to reduce the error signal.

Furthermore, since the I-tips 21a and 21b draw constant loci on the magnetic tape 3, it is further possible to give a record/playback function the same as a magnetic head to the I-tips 21a and 21b so as to record/reproduce addresses or the like on picture frames.

Although illustrative embodiments of the invention have been described in detail herein with reference to the accompanying drawings, it is to be understood that the invention is not limited to those precise embodiments, and that various changes and modifications can be effected therein by one skilled in the art wihout departing from the scope and spirit of the invention as defined by the appended claims.

We claim:

1. A rotary magnetic head drum apparatus of a helical scan type video tape recorder comprising a drum at least a portion of which is fixed, said drum having an outer surface around which a magnetic tape is wound for reproduction, at least one rotary magnetic head having a contact surface of a predetermined shape for reproducing a signal from said magnetic tape, said head moving through at least one switching position relative to said drum and which is located substantially adjacent to a position where said magnetic tape tangentially contacts said drum, said contact surface of the head contacting said tape during reproducing; and a member having approximately said predetermined shape of said contact surface of the head and projecting radially from the outer surface of said drum adjacent to said switching position to contact said magnetic tape and locally displace said magnetic tape radially outward from said outer surface thereby to reduce impact error in a signal reproduced from said magnetic tape by said magnetic head.

2. Apparatus according to claim 1 wherein the position of said member is adjustable relative to the outer surface of said drum so as to adjust the displacement of said magnetic tape.

3. Apparatus according to claim 1 wherein said member is made of ferrite.

4. Apparatus according to claim 1 wherein said member is made of sintered ferrite.

5. Apparatus according to claim 1 wherein said magnetic tape is wound at least 120° around said drum, said drum having two magnetic heads positioned around said outer surface, said switching positions for said magnetic heads are positioned adjacent to where said magnetic tape first contacts said drum and where said magnetic tape parts from said drum; and said member is positioned substantially adjacent to each of said switching positions.

6. Apparatus according to claim 5 wherein one said member is positioned at an angle of 4° to 6°, on the entrance side, from said position where said magnetic tape first contacts said drum and the other said member is positioned at an angle of 4° to 6°, on the exit side, from said position where said magnetic tape parts from said drum.

7. Apparatus according to claim 5 wherein one said member is positioned at an angle of 4°, on the entrance side, from said position from where said magnetic tape first contacts said drum and the other said member is positioned at an angle of 4°, on the exit side, from said position from where said magnetic tape parts from said drum.

* * * * *